Jan. 2, 1968   K. J. MADDOCK   3,361,481
ROTATING CUTTER BIT
Filed Oct. 18, 1965

INVENTOR.
KENNETH J. MADDOCK
BY
*Hill Sherman Meroni Gross & Simpson*

United States Patent Office 3,361,481
Patented Jan. 2, 1968

3,361,481
ROTATING CUTTER BIT
Kenneth J. Maddock, Frankfort, Ill., assignor to Westinghouse Air Brake Company, Pittsburgh, Pa., a corporation of Pennsylvania
Filed Oct. 18, 1965, Ser. No. 497,020
5 Claims. (Cl. 299—86)

ABSTRACT OF THE DISCLOSURE

A cutter bit for a mining machine formed as a frusto-conical head having a hard metal tip and a concentric reduced diameter shank mounted for free rotation in a cutter block socket. The conical head is provided with a plurality of spiral ribs to frictionally engage the material being mined to cause positive rotation of the cutter bit. The spiral ribs are uniform in cross-section throughout their length so that the furrows remaining between the ribs increase in width from the front to the rear of the bit.

---

This invention relates to improvements in cutter bits of the type used on mining machines for niming coal and the like, and more particularly relates to an improved form of tipped bit having a hardened cutting insert.

Cutter bits having hardened cutting tips or inserts have commonly been used in mines, on cutter chains and the rotary boring heads of continuous mining machines. These cutter bits are usually mounted so the tips cut with a scraping action. The cutting edges of the hardened tips, which are usually carbide tips, are extremely brittle, with the result that the tips frequently break off particularly when the cutter is reversed or when encountering hard inclusions in the seam.

A principal object of the present invention therefore, is to remedy the foregoing deficiencies in tipped cutter bits by providing an improved form of cutter bit in which the hardened tip is supported to cut with a wedging action.

A further object of the invention is to provide an improved form of cutter bit having a hardened cutting tip, in which the bit is mounted in its support for free rotation, providing even wear and self-sharpening of the bit.

A still further object of the invention is to provide a new and improved form of cutter bit having a generally frusto-conical head with a hardened carbide insert in the small diameter portion of the head and having a generally conical tip, and supported in its support to cut with a wedging action, in which the head is so formed as to rotate the bit during cutting, to effect self-sharpening and uniform wear of the bit.

A still further object of the invention is to provide an improved form of carbide tipped cutter bit having a conical carbide tip supported on the small diameter end of a frusto-conical head, in which the head is mounted in its support for free rotation and is so formed as to be continually rotated by engagement of the head with the material being cut.

These and other objects of the invention will appear from time to time as the following specification proceeds and with reference to the accompanying drawings wherein.

Figure 1:
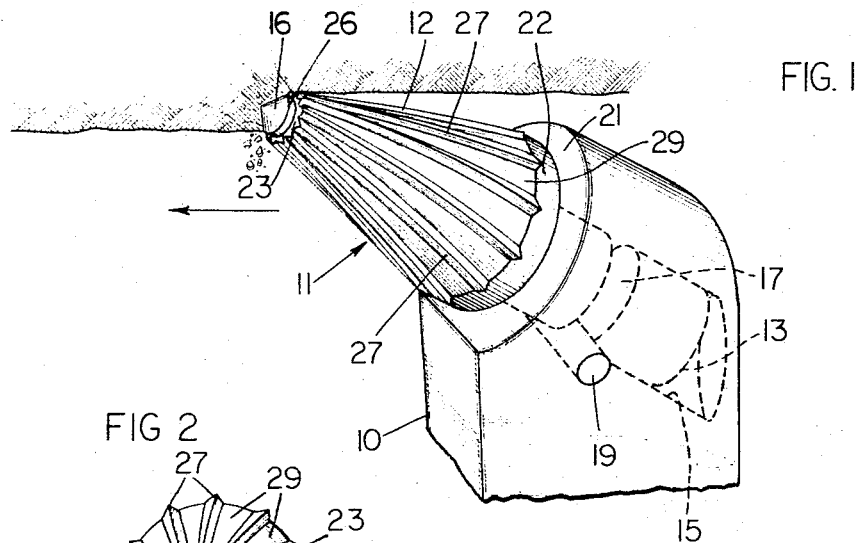
FIGURE 1 is a generally perspective end view of a cutter bit constructed in accordance with the principles of the present invention, showing the bit mounted in a travelling bit holder.
Figure 2:
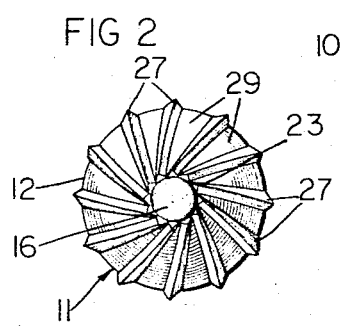
FIGURE 2 is a front end view of the bit shown in FIGURE 1.

Referring now to the details of the embodiment of the invention illustrated in the drawings, a cutter support or block 10 is shown in FIGURE 1 as supporting a cutter bit 11, and as advancing the cutter bit along the working face of a mine. The cutter block 10 may be the bit carrying block of a mining machine cutter chain or may be mounted on the cutter support of a rotary boring head or other mining device used in mining coal and the like, by movement of the block and bit along a mine face, as the machine advances into the face.

The bit 11 has a generally frusto-conical head 12 and has a coaxial reduced diameter generally cylindrical shank 13 extending from the large diameter end thereof. The shank 13 is shown in FIGURE 1 as being rotatably mounted in a socket 15 in the cutter block 10, extending at an angle to position a cutting tip 16 of the bit to mine with a wedging cutting action. The shank 13 has an outwardly opening recess 17 formed therein, intermediate its ends, and extending thereabout. A pin 19 extending transversely of the cutter block 10 and mounted therein slidably engages said recess to retain the bit to said block and accommodate ready rotation of the bit in said block during the operation of cutting.

The shank 13 terminates at its outer end into a shoulder 20 inclined outwardly and forwardly with respect to said shank to provide clearance between the head 12 and a face 21 of the cutter block 10 and enhance freedom of rotation of the cutter bit in said block. The shoulder 20 terminates into a generally cylindrical wall 22, which is relatively short compared with the length of the head, and defines the large diameter end of the frusto-conical face of the head 12.

Figure 3:
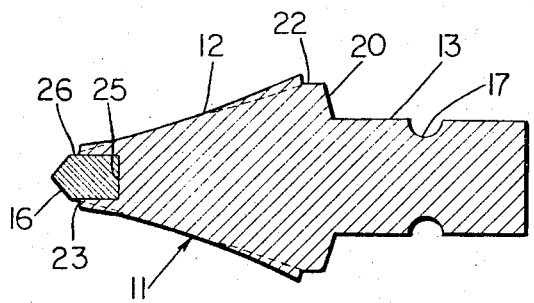
FIGURE 3 is a longitudinal sectional view of the bit.

The frusto-conical face of the head 12 is shown in FIGURE 3 as being slightly concave and as terminating at its outer end into a reduced diameter end portion 23 providing the stock to back and support the tip 16. The flattened end portion 23 is axially drilled from the outer end thereof to form a generally cylindrical socket 25 for the tip 16.

The tip 16 may be bonded to the socket 25 of the head 12 in a conventional manner and may be made from a hardened metal alloy substantially harder than the metal from which the head 12 is made, and preferably may be made from one of the well known carbides conventionally used to tip cutting tools, such as cutter bits and the like.

The tip 16 has a generally coniacl cutting point extending outwardly of a cylindrical body 26 of said tip, spaced inwardly along the end portion 23 of the head 12 a distance sufficient to provide stock for a series of spiral convolutions or ribs 27. The spiral ribs 27 are shown as being generally V-shaped in cross-section and uniform throughout their length and diverging from each other as they extend along the head to the base thereof and leaving furrows 29 therebetween, shown as increasing in width from the face 23 to the wall portion 22 of the head 12.

Figure 4:
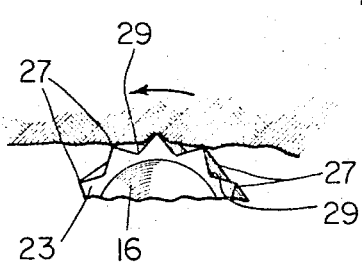
FIGURE 4 is a fragmentary view of the bit, illustrating the wedging of the body of the bit against the material being cut, to effect rotation of the bit as advancing along a mine face.

As shown in FIGURE 4, the ribs 27 provide a serrated end portion of the head 12, which is wedged into the material being cut as the bit moves therealong. This wedging of the ribs 27 into or against the material being cut effects a positive rotation of the bits in the block 10, as said block advances along a mine face during the cutting operation, and provides a constantly changing cutting edge of the tip 16, providing even wear of the tip and self-sharpening thereof. This not only maintains the tip sharp but also obviates the forming of flat spots on the tip and head.

It may be seen from the foregoing that a novel and improved form of cutter bit has been provided utilizing a conical cutting tip or insert, which may be made from a hardened metal alloy, and supporting the insert to cut with a wedging action rather than the conventional scraping action, and so supporting the tip as to avoid the exposure of weak edges which may break off, and sufficiently supporting and protecting the tip to prevent breaking of the tip from the bit, should the cutter block be moving in a reverse direction.

It may further be seen that by the simple spiral convolutions extending along the frusto-conical face of the head of the bit, the bit is continually turned during operation to provide even wear on the tip and self-sharpening thereof.

While I have herein shown and described one form in which the invention may be embodied, it may readily be understood that various modifications and variations in the invention may be attained without departing from the spirit and scope of the novel concepts thereof.

I claim as my invention:

1. In a cutter bit for mining machines and the like and in combination with a mining machine cutter block movable along a mine face and forming a support for the bit,
a generally frusto-conical head having a reduced diameter leading end and a large diameter trailing end,
a concentric shank extending from the large diameter trailing end of said head for rotatable mounting in the mining machine cutter block,
a hardened cutting tip recessed in and bonded to the small diameter leading end of said head and extending axially therefrom and having a generally conical cutting tip penetrating the material being mined with a scraping action upon travel of the bit along a mine face,
and spiral ribs extending along said conical head from the leading to the trailing end thereof and providing the frictional contact with the material being mined to effect positive turning of the bit within the cutter block upon cutting movement of said cutting tip along a mine face.

2. A cutter bit in accordance with claim 1, wherein the shank has an outwardly opening recess extending thereabout wherein a pin mounted in the cutter block and extending chordally of the shank, extends along said recess to accommodate rotation of said bit within said cutter block and to retain said bit to said block, and wherein the spiral ribs are uniform in cross-section throughout their length, leaving furrows therebetween increasing in width from the leading to the trailing end of the bit.

3. In a cutter bit,
a cutter block therefor of a type moving along the mine face as it is advanced into the mine face,
a cylindrical shank rotatably mounted in said cutter block and supporting the bit at a cutting angle with respect to a mine face,
a generally frusto-conical head extending from said shank and tapering toward its outer end,
a generally conical cutter tip inserted in and bonded to the end of said head and extending axially therefrom,
the frusto-conical face of said head having helical convolutions in the form of spiral ribs extending for the length of said face to effect positive rotation of said bit by the wedging of said ribs into the material being mined during the operation of advancing said tip into and along a mine face, to effect a mining operation.

4. A cutter bit in accordance with claim 3,
wherein the ribs are of a generally V-shaped cross-section throughout their length and have furrows therebetween opening to the end of the head supporting the tip and increasing in width from the leading to the trailing end thereof to provide a self-cleaning serrated end portion of said head wedging into and rotating said bit during the operation of advancing said tip into and along a mine face, to effect a cutting operation.

5. The structure of claim 3,
wherein the shank has an outwardly opening annular recessed portion extending thereabout,
wherein a pin extending through said block is slidably engaged by said recessed portion to accommodate rotation of said bit in said block and to retain said bit thereto,
and wherein the ribs are V-shaped in cross-section and of uniform cross-section throughout their length and leave furrows therebetween increasing in width from the leading to the trailing end of said cutter bit.

References Cited

UNITED STATES PATENTS

| | | | |
|---|---|---|---|
| 1,550,669 | 8/1925 | Bowman | 299—86 X |
| 1,860,587 | 5/1932 | Metzger | 175—377 X |
| 2,528,300 | 10/1950 | Degner | 175—377 |
| 3,268,260 | 8/1966 | Snipe | 299—91 |

ERNEST R. PURSER, *Primary Examiner.*

UNITED STATES PATENT OFFICE
CERTIFICATE OF CORRECTION

Patent No. 3,361,481                          January 2, 1968

Kenneth J. Maddock

It is certified that error appears in the above identified patent and that said Letters Patent are hereby corrected as shown below:

Column 2, line 48, "coniacl" should read -- conical --; lines 59 and 60, after "serrated" insert -- entering --.

Signed and sealed this 20th day of October 1970.

(SEAL)
Attest:

Edward M. Fletcher, Jr.                      WILLIAM E. SCHUYLER, JR.
Attesting Officer                              Commissioner of Patents